July 15, 1969 J. P. JONES, JR 3,456,077
HIGH SPEED ELECTRONIC KEYBOARD ASSEMBLY
Filed Sept. 22, 1965
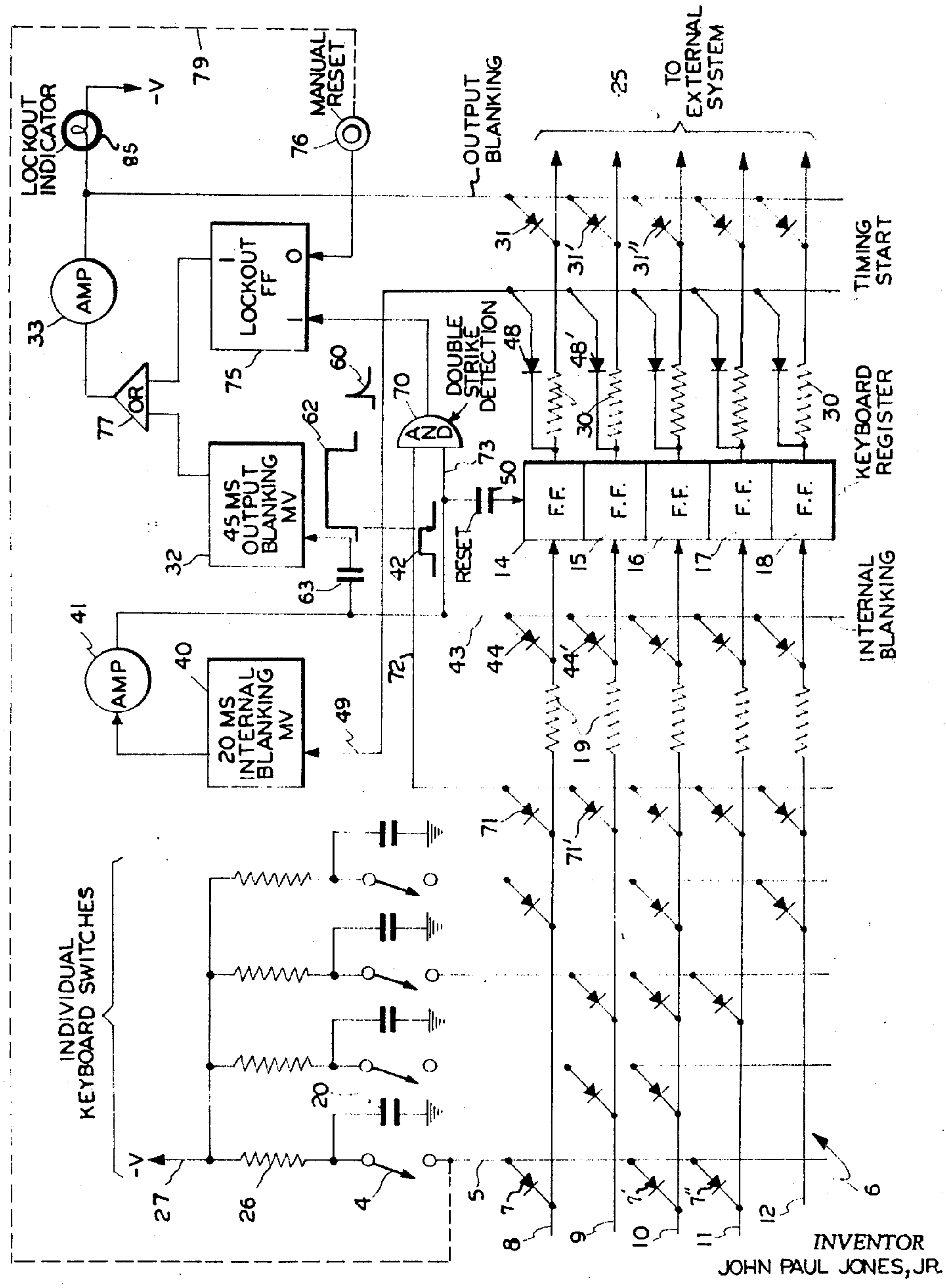
INVENTOR
JOHN PAUL JONES, JR.
BY Watson, Cole, Grindle & Watson
ATTORNEYS 3,456,077
Patented July 15, 1969

3,456,077

HIGH SPEED ELECTRONIC KEYBOARD ASSEMBLY

John P. Jones, Jr., Wayne, Pa., assignor to Navigation Computer Corporation, a corporation of Pennsylvania Filed Sept. 22, 1965, Ser. No. 489,196
Int. Cl. H04l 15/18, 15/12, 15/16
U.S. Cl. 178—17 16 Claims

ABSTRACT OF THE DISCLOSURE

An electronic keyboard set provides input to a data processor having a different time base of operation than the keyboard. The keyboard data is read into a storage register, which will retain a key selection for a set first time period. A second set period is commenced upon completion of said first period, and during said second period the data processor is blocked from accepting data from the storage register. At the end of its own fixed delay period, the register is enabled to receive data, while the inhibit period for readout to the processor is still going on.

This invention relates to a keyboard assembly for working into an electronic system with a fixed cyclic period of operation exceeding the fastest encountered operation period between the manual operation and closing of two successive keyswitches, and more particularly, it relates to a keyboard operating technique which speeds up manual operation or typing speeds by preventing double-strike errors during the system operation cycle.

Peripheral entry of data in many electronic systems such as printers, punches, computers, and data processing equipment from manual sources requires compatible keyboard operation. However, the operational cycle of external systems adaptable for manual keyboard entry of data may vary from ten to twenty cycles per second to conform to usual average typing speeds of ten characters per second. In most systems the entry of data is controlled by the keyboard with appropriate error or interlock conditions should the operator exceed system speeds or accidentally operate two keys at the same time. It has been found in extensive tests with such keyboard operated systems that the effect of interlocks and error detectors is to discourage high speed operators with resulting system inefficiency. The desirable system therefore requires a high-speed keyboard assembly which does not interfere with inherent capabilities of a high speed operator by interposing mechanical interlocks or unnecessary error signals.

Most of the cases in which a keyboard operator exceeds external system capabilities occur in repetitive, familiar slurring sequences such as "a-n-d," "t-h-e" or "i-n-g," where there may be as little as 20 milliseconds separation between successive closure of two keys. An external system to accept such sequences would have to operate at fifty cycles per second whereas normally an average typing speed rate could not exceed ten or fifteen characters per second, thus imposing excessive system costs for rarely encountered conditions.

A condition contributing to system errors is that of double key strikes which are undetectable. This depends upon the tolerance of the keyboard in combination with the system to detect all double-strike errors. Such errors are difficult to detect in mechanical systems when the timing interval in the system between operation of one key and the lockout of the system from accepting a further key operation is large.

Accordingly, it is a general object of this invention to provide an improved high-speed electronic keyboard that cooperates with an external system having a fixed period of cyclic operation controlled from the keyboard.

A further object of the invention is to provide an electronic keyboard assembly in which essentially all double-strike errors are detected.

Another object of the invention is to provide an electronic keyboard assembly which permits the operator to attain temporary speeds which exceed the average speeds of the external system operational cycle.

A still further object of the invention is to provide an electronic keyboard assembly which does not interfere with operator touch or routine by introducing excessive error indications.

Still another object of the invention is to introduce a keyboard assembly workable with external cyclic electronic systems which is more efficient by permitting an operator to attain faster keyboard entry speeds.

The above objects, features and advantages are realized in accordance with this invention by separating the timing cycle of the keyboard-operator from the timing cycle of external equipment operated by the keyboard and providing separate independent interlock systems for each cycle. Thus, one set of keyboard blanking signals is produced for internal keyboard operation which permits entry of keyboard data in the order of every twenty milliseconds, where as the external system operation period is in the order of fifty to one hundred milliseconds. Corresponding controls and registers are provided to process data encountered during peak speed periods at a faster rate than that which the external system will accept to thus produce a less expensive and complex overall system yet permitting higher operational speeds to be attained than the system cycle period would otherwise permit.

These objects and advantages together with other features of the invention are described in more detail in the following specification with reference to the accompanying drawing which is a schematic circuit diagram, partly in block, of a typical system embodying the invention.

It is seen by reference to the drawing that each keyswitch 4, which is manually depressable and arranged in a spaced grouping such as a conventional typewriter keyboard layout, is coupled to the corresponding column conductor 5 of the diode encoding matrix 6. Thus, as seen from column 5, diodes 7, 7', 7'' are coupled to matrix rows 8, 10, and 11 to produce an output signal for setting corresponding flip-flops 14, 16, and 17 in the keyboard register coupled to the matrix rows by way of intermediate resistors 19 in each row. Each keyswitch 4, when closed serves to discharge its accompanying capacitor 20 into the matrix rows designated in binary coded form by the connection of diodes from the column line 5, so that each key presents a unique designation in binary coded form, such as five bit Teletype code, which serves to set flip-flops 14–18 and be retained therein for eventual use at register output leads 25 by an external system (not shown) such as a digital computer, electronic typewriter, or tape punch. The capacitor 20 is charged by way of resistor 26 from a negative d-c potential source (—V) at terminal 27. The resistor slowly charges capacitor 20 between keyswitch operations, and limits current flow from the source into the matrix 6. Thus, the capacitors 20 supply enough "one-shot" current over a short time period of perhaps ten microseconds to set flip-flops 14–18, and even if the keyswitch is held down manually for a relatively long time, the current flow through resistor 26 is not effective to create disturbances in circuit operation.

In general, the present invention becomes important when the operating cycle of the external system is in the order of more than 50 milliseconds. Thus, an electronic printer working at fifteen characters per second would have a cycle time of 67 milliseconds. It is possible for a typist to close two keys 4 on the keyboard within the operation period of the external equipment, and therefore cause a double-strike error. For this reason, it is desirable for the keyboard to be effectively disconnected from the external system for a period of time corresponding to its operation period. Accordingly, resistors 30 in the register output lines 25 together with blanking diodes 31 permit electronic decoupling of the keyboard register from the external system for a time period established by time generating multi-vibrator 32 as presented through amplifier 33. Such keyboard blanking techniques which decouple the keyboard from the external system over its entire operating period are described and claimed in my copending application Ser. No. 335,641, filed Jan. 3, 1964 now Patent No. 3,239,608 for Recorder System.

It has been found; however, that fast typists tend to have peak speeds for exceeding average speeds. Thus, in a common sequence such as "t-h-e" or "i-n-g" the time between keyswitch closures may approach twenty milliseconds even though an average typing speed of more than fifteen characters per second cannot be maintained. Under these conditions the electronic blanking technique, which is generally associated with an error detector and lockout arrangement, will cause the operator to stop, check for errors, and manually reset the keyboard before proceeding. Therefore, a penalty assessed upon the fast typists who tend to slur between characters in certain sequences. This limitation is effectively eliminated by providing a two-step blanking procedure in accordance with the present invention, which blanks the keyboard and the external circuits separately and sequentially.

To accomplish this mode of operation, a typical embodiment is set forth in the drawing, wherein a keyboard or internal blanking cycle is provided by a first timing generator 40 supplying from amplifier 41 timed pulses 42 of a duration in the order of twenty milliseconds. These pulses then by way of internal blanking lead 43 and accompanying diodes 44, 44' leading to each row conductor 8–12 of matrix 6, effectively isolate the keyboard switches 4 from the keyboard register flip-flops 14–18 only for a portion of the time period it takes the external system to complete an operation cycle.

Each internal blanking period is initiated by a change into set position of any flip-flop 14–19 in the keyboard register, which occurs with a new keyswitch closure (not received during the internal blanking period). This signal is sensed by diodes 48, 48' to produce a timing start trigger pulse at the input line 49 to the time period generator 40. The trailing edge of the resulting waveform 42 as indicated by the arrow is then used to reset the keyboard register by way of capacitor 50, so that it may receive a further information entry from a successive keyswitch closure, which will be held for use at the output lines 25 by the external system for initiating a new external system operational cycle at the time the output blanking signal on diodes 31 is terminated. This blanking signal in essence grounds the output leads 25 and thus by action of series resistors 30 prevents the new entry in flip-flops 14–18 from initiating a new internal blanking cycle at lead 49 until the pulse 60 is produced as the clamping is removed at the end of the output blanking period if some of the flip-flops 14–18 are found in a set condition signifying entry of a new keyswitch code. If no key is closed during the interval, all flip-flops will remain reset and no timing trigger pulse 60 will be generated. Thus, as long as the peak timing speed is limited to spurts with an average speed no greater than the capabilities of the external system, this keyboard technique produces faster typing speeds and effectively increases not only keyboard speed but the speed of the entire system.

In the exemplary system shown with a fifteen per second external system capability, the output blanking period would be a pulse 62 of about 45 milliseconds as produced in output blanking timing generator 32. This output pulse follows sequentially the internal blanking pulse 42 and is triggered at its trailing edge through capacitor 63.

For purpose of detecting any errors which are introduced by closing two keys simultaneously (at an interval less than the twenty millisecond blanking period) the double strike detection gate 70 is introduced along with sensing diodes 71, 71' connecting input lead 72 to sense any key closure from the matrix 6 rows 8–12 during the interval blanking interval at which pulse 42 is present on the second coincidence input lead 73. If such an error occurs, lockout flip-flop 75 is set into its "one" state until reset to "zero" by manual reset button 76. This serves by way of "OR" gate 77 to maintain lockout of the blanking amplifier 33 until the operator checks to see that no error has been made. This mode of operation does not normally require introduction of an error code since no entry is made in the keyboard register to replace the correct entry and the operator may simply reset and enter the last character which was missed because of a double strike sequence. However, since this is a position of potential error, an error or check code may be simply entered by coupling the manual reset key 76 as one of those in the keyboard connected to a column conductor such as 5 of matrix 6 as suggested by dotted line 79.

The slurring problem is effectively controlled by the purely electronic keyboard blanking technique so that the operator will not know that the speed of the system has been exceeded except in cases of lockout as distinguished from a mechanical key interlock which interposes an inhibition feel under similar circumstances. Thus, psychologically, this system also has the profound effect of increasing operators' speed since no mechanical or error inhibitions are normally encountered in the absence of an almost deliberate closure of two keys simultaneously.

It is important also to provide a good "crossover" characteristic, which is accomplished by this electronic keyboard system in a manner unattainable in a mechanical operation. The crossover characteristic may be defined as the time interval between which a new key can be depressed after the last key is released. This is narrowed to a few microseconds in the system herein proposed, so that there is negligible chance of simultaneous closing of two keys to introduce an error as compared with a mechanical system which requires millisecond intervals.

Consider this operation in the present system with a capacitor discharge time constant of about twenty microseconds. The effective operation time of a key closure to set the flip-flop keyboard register and initiate an internal blanking pulse effective to decouple the keyboard at interval blanking lead 43 is readily designed by conventional electronic circuits to introduce a delay of not more than about ten microseconds. The chances of any double-strike crossover errors in this short period have proven negligible in extensive field tests so that the present system has a good crossover characteristic and is relatively immune from undetected double-strike errors.

A further feature of this system is the visual lockout indicator lamp 85 which serves in normal operation to flicker for each keystroke and thus give the operator a "feel" that the system is accepting data, since no other indication will exist such as sound or printer impact in many electronic systems.

What is claimed is:

1. A high speed electronic keyboard for operating an electronic system comprising in combination, a set of manually operable keys each producing a switching operation to close a set of contacts, a network coding switch closures from each key into a corresponding binary code group at a set of output lines, a keyboard storage register for each of said lines to be set into a storage condition retaining the corresponding binary code group for presentation at a set of output leads, inhibiting means in the set of output lines to block entry of keyset signals into said register, means establishing a blanking signal of duration over a first short period in the order of twenty milliseconds responsive to entry of keyset signals into said register, means responsive to the blanking signal to operate said inhibiting means and thereby prevent entry of further keyset signals into the register for the duration of the blanking signal, means detecting a further key closure during this period to provide an error signal, means responsive to the trailing edge of said blanking period signal to clear said register to receive further information from a subsequent key closure, means responsive to the trailing edge of said blanking period signal to produce a successive blanking signal for an extended period of the order of fifty milliseconds, and further inhibiting means coupled in the output leads of said register and responsive to said successive blanking signal to prevent entry of the keyset code into said electronic system, whereby keyset signals spaced at a greater distance than said short blanking period are entered into said electronic system to produce a higher effective keyboard entry speed.

2. The keyboard defined in claim 1, wherein said error signal is retained in a lockout storage device which must be manually reset, and the further inhibiting means is controlled by the lockout device to prevent entry of keyset signals into said system after detection of an error.

3. The keyboard defined in claim 2 including a manual reset key coupled to reset the lockout device and providing entry of a coded error signal on said set of output lines and thus into said register.

4. The keyboard defined in claim 1 wherein each manually operable key includes a storage capacitor connected to discharge upon said contact closure to corresponding coded lines in said set.

5. A keyboard assembly including a temporary keyboard register holding keyset information for a storage period of duration less than thirty milliseconds, means for entering the information from the register into an external electronic system during the storage period; external system means utilizing the information stored in said register, means effectively decoupling the register from the external system during a blanking period of predetermined time corresponding to the operating cycle of the external system in the order of fifty milliseconds from the end of said storage period, and means clearing the register and permitting entry of further keyset information during the blanking period while the external system is undergoing an operating cycle.

6. An electrical keyboard assembly including a set of manually operated keyswitches, a set of coding circuit lines for operating a periodically operable external electronic system having a fixed operation period with unique binary coded signals derived from different keys in said set, means between said keyswitches and said lines for storing and presenting thereto a binary code signal from said keys for a first blanking portion of a timing period shorter than the remaining blanking period of said timing period, and inhibiting means in said lines blanking keyset signals from the external system for said longer period of time related to the operational period requirement of the external system immediately following the shorter blanking period to thereby permit a further keyswitch operation to store a signal in said means storing the signal while the internal operating period is in progress.

7. An assembly as defined in claim 6 including means preventing retention and presentation of coded signals from any further keyswitch operated within said limited time period.

8. An assembly as defined in claim 6 including a detection circuit for presenting a signal for any keyswitch operated during said limited time period, and resettable lockout means responsive to the latter signal preventing further keyset entry of data into said system until the lockout means is reset.

9. An assembly as defined in claim 6 including a visual indicator operated by the said means providing the longer blanking period to indicate only during the length of the period the keyswitches are decoupled from the external system to thereby produce an indication for each new data entry from the keyswitches.

10. An assembly as defined in claim 6 wherein the key register comprises a set of binary coded flip-flops with output signals coupled to said external system, and a coding matrix coupling each key to set a unique combination of the flip-flops responsive to operation of the key.

11. An assembly as defined in claim 10 wherein a timing signal generator is provided responsive to operation of said keys to produce a holding period signal, and means responsive to said signal resetting said flip-flops at the end of said holding period.

12. An assembly as defined in claim 11 wherein an inhibition circuit is interposed between said keys and said flip-flops, and holding signals from generator are coupled to the inhibition circuit to prevent a second keyswitch signal at the flip-flops during the holding period.

13. An assembly as defined in claim 12 wherein an error detector is included which is responsive during the holding period to a further keyswitch operation to develop an error signal therefrom.

14. An assembly as defined in claim 13 including a lockout circuit responsive to said error signal to decouple the signals from said flip-flops from said external system.

15. An assembly as defined in claim 6 including error means operable responsive during said holding period to detect and signify the manual operation of a further keyswitch.

16. An assembly as defined in claim 15 wherein the error means operates a lockout device coupled to prevent entry of further signals into said external systems, and manual reset means coupled to the lockout device for removing the lockout condition.

References Cited

UNITED STATES PATENTS

| | | | |
|---|---|---|---|
| 2,927,960 | 3/1960 | Byrnes | 178—2 XR |
| 2,942,253 | 6/1960 | Pederson | 197—107 XR |
| 2,952,731 | 9/1960 | Wright et al. | 178—2 |
| 3,115,583 | 12/1963 | Hinkein | 340—166 XR |
| 3,206,743 | 9/1965 | Nielsen | 178—17 XR |
| 3,214,735 | 10/1965 | Reuther et al. | 340—147 |
| 3,232,222 | 2/1966 | Jones | 101—93 |
| 3,239,608 | 3/1966 | Jones | 718—26 |
| 3,350,688 | 10/1967 | Kasper et al. | 340—166 |

THOMAS A. ROBINSON, Primary Examiner

U.S. Cl. X.R.

178—17.5; 197—98; 340—166